Feb. 1, 1955 R. M. McKINNEY 2,701,179
METAL HALIDE PRODUCTION
Filed Feb. 24, 1951
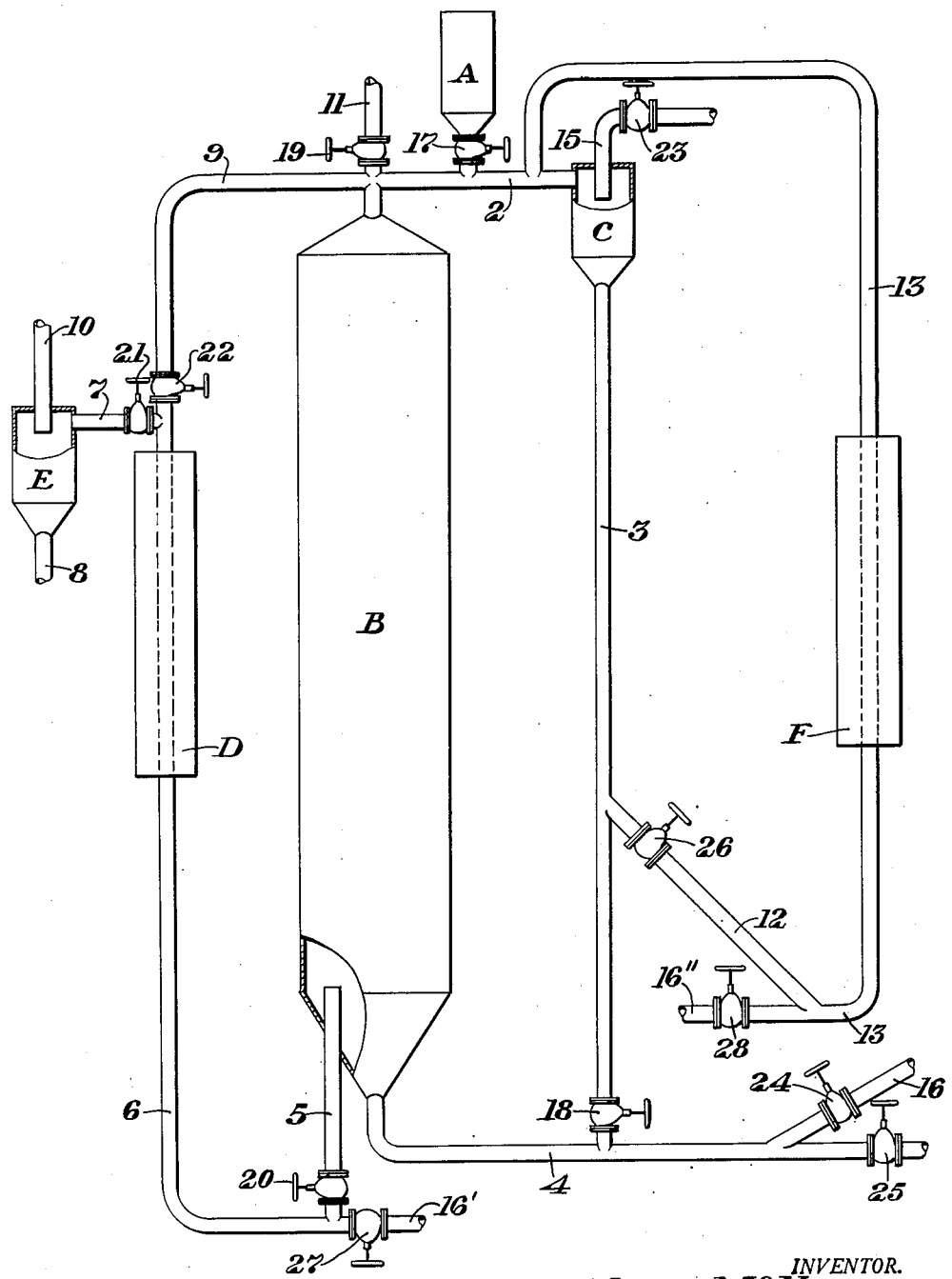
INVENTOR.
Robert Myers McKinney
BY
ATTORNEY

United States Patent Office 2,701,179
Patented Feb. 1, 1955

2,701,179

METAL HALIDE PRODUCTION

Robert M. McKinney, Wilmington, Del., assignor to E. I. du Pont de Nemours and Company, Wilmington, Del., a corporation of Delaware Application February 24, 1951, Serial No. 212,640

6 Claims. (Cl. 23—87)

This invention relates to the preparation of volatile metal halides, and more particularly to novel and improved methods for producing iron and titanium halides through reduction and halogenation of oxidic substances.

As is well known, titanium tetrachloride, iron chloride, aluminum chloride, or other volatile halides, may be obtained by chlorinating a briquetted or pelletized mixture of reducing agent and oxidic ore at an elevated temperature. For instance, in U. S. Patent 1,179,394 titanium tetrachloride is obtained by chlorinating, at temperatures ranging from 650–750 C., a titanic agglomerate prepared by mixing a titaniferous material, such as rutile, with a carbonaceous binder (tar, pitch, asphalt, coal, etc.) and heating this mixture to redness in a retort, in the absence of air, to produce the desired porous cinder or magma. Similarly, in U. S. Patent 1,707,257 titanium tetrachloride is prepared by chlorinating at temperatures of 650–850° C. a dry, porous, briquetted or pelletized mass made up of a mixture of carbon (coke or charcoal) and a titaniferous ore together with colloidal, peptized $TiO_2$ as the binding agent.

The use of granular or briquetted masses in such prior metal halide production processes has been considered essential in properly facilitating the furnacing operation and reducing corrosion losses due to the presence and use of elementary chlorine. The porosity of the bed of briquette permits passage of the chlorinating gas through the bed of metal oxide and carbon, the resulting reaction consuming the solid material and yielding gaseous products. The carbon leaves the furnace as a gaseous oxide and the titanium (or other metal) becomes volatilized as the chloride. Any iron present is converted to ferrous or ferric chloride, depending upon the furnacing conditions. Other impurities present in the material processed may appear in the ash residue, suitable provision being made, such as a grate arrangement with the furnace, to remove such ash without interrupting the halogenating operation.

As stated, various binders must be used in preparing the briquettes or granular masses used in such prior procedures. In addition to the tarry and other materials mentioned, starch and other organic products, as well as sodium silicate, are employed. The use of these agents is disadvantageous because, among other things, these hydrogen-containing organic binders, after formation of the briquette, must be calcined to expel such hydrogen. Otherwise, hydrogen chloride will form and chlorine loss will be incurred during the halogenating operation. In addition, briquetting and calcination operations are disadvantageous because considerable plant installations are required, which obviously increases the cost of the ultimate product. Also, special equipment must be associated with the furnace to expedite briquette introduction and ash removal, while sealing the furnace at the same time against chlorine and chloride loss. Obviously, there is afforded in this type of operation a difficult, expensive process, which, with its prevailing corrosive atmosphere, requires the taking of steps to effect leak prevention in avoiding fume nuisance and metal chloride and chlorine loss to the atmosphere.

Other disadvantages which the briquette furnace presents are the localized overheating of the solids which occurs in a stationary bed with its consequent sintering of the charge and excessive clinker formation, and the limited reaction rate due to the surface exposed to the chlorine. On the other hand, pellets or briquettes of relatively large mass and, therefore, low surface, compared to the individual particles making up the pellet, are required in order that the chlorinating gas can pass through the bed of metal oxide and carbon.

I have found that these and other disadvantages, technical difficulties and expense encountered in prior metal halide production, and especially in processes requiring the use of briquettes or granular substances, can be effectively remedied. A salient object of the invention, therefore, is to effectively overcome these disadvantages and to provide a novel and improved method for obtaining such results. A particular object is to provide a novel process for preparing metal chlorides, especially of titanium and iron, from titaniferous ores, and without recourse to the usual binding agents, briquetting or pelletizing of the oxidic ore and coal or other reducing agent, or to precalcination treatment to eliminate compounds of hydrogen, such as hydrocarbons and water. A further object is to provide a relatively simple and economical method for producing such volatile metal halides and one which, due to its improved ease of operation, is adaptable to ready, large-scale industrial or commercial application.

A further object is to effectively control the temperature of the reaction chamber to a desired degree of uniformity throughout the operation and avoid any sintering of the charge and production of undesirable by-product ferrous chloride, in the chlorination of ferruginous material. Still further objects are to increase the rate of reaction of the chlorine and the oxidic substances and avoid the use of cumbersome grate arrangements for supporting the charge and removing ash which are particularly troublesome in corrosive atmospheres such as that of chlorine. Other objects and advantages will be evident from the following description and accompanying drawing.

In its broader aspects, the invention comprises reacting at an elevated temperature and in the presence of a reducing agent a halogen-containing gas with a finely divided, oxidic, metal-containing substance, the halide of which is being produced (especially titanium and iron), and effecting said reaction while maintaining said substance suspended and in constant motion in a reaction zone in the gaseous halogenating reactant.

In a more specific and preferred embodiment, the invention comprises producing a volatile metal chloride, particularly of titanium and iron, by reacting at an elevated temperature and in the presence of a finely divided reducing agent a powdered oxidic titanium ore, and effecting said reaction in a vertical, elongated reaction zone in which the reactants, during the conversion, are maintained suspended in a continuously flowing gaseous fluid for continuous movement in said zone.

Referring to the figure of the drawing, which is merely a diagrammatic illustration, not to scale, of one form of apparatus in which the invention may be carried out in a continuous type of operation, there is shown, in general combination, a suitable hopper or storage chamber A, a vertical reaction chamber B, relatively restricted in cross section, cyclone separators C and E and coolers D and F. In operation, a finely ground mixture of a powdered carbonaceous reducing agent (such as coal or carbon) and a finely ground oxidic material (a metallic ore to be reduced) are introduced into the system from hopper A by means of valve-controlled outlet 17 from whence the solids pass into a suitable conduit 2 to become intimately mixed with and preheated by hot, gaseous products being discharged from reactor B. Conduit 2 thus acts as a heat exchanger, cooling the products of the furnace B and heating the solid feed material being introduced into the system. The solids are separated from the gaseous product, in cyclone C. The gaseous products are discharged from the cyclone through conduit 15, controlled by valve 23, and pass to a condensing system (not shown) wherein halides synthesized in the process are recovered. The separated solids comprising the preheated ore-reducing-agent mixture from the cyclone C fall into its stand-pipe 3 to be withdrawn, via control valve 18, into a communicating conduit 4, controlled by valve 25, leading to reactor B and into which chlorine or other halogen-containing reaction gases pass from a source of supply (not shown)

for introduction into the system. As shown, line 4 is in open communication with, and leads into, the interior, lower portion or bottom of the reaction chamber B and also communicates with a line 16, controlled by valve 24 through which hot combustion products may be introduced into the system. The upper or top outlet portion of the reactor is in open communication with conduit 2 which discharges gaseous reaction products from the reactor.

In the operation of an apparatus such as that described to obtain titanium tetrachloride and ferric chloride in accordance with a preferred adaptation of the invention, a finely ground (capable of passing 50 mesh) mixture, comprising about 1 part of powered coke and about 5 parts of powdered ilmenite, is fed from the storage vessel A, via valved outlet 17, conduit 2, cyclone C, stand-pipe 3, and valve 18, into the restricted conduit 4, wherein the pre-heated mixture becomes entrained in the chlorine-containing gas being fed to the system. The feed rate of the gas passing through line 4 is preferably at such velocity that not only will it effectively entrain the comminuted solids being fed thereinto, but said solids will remain entrained after their introduction into the reaction zone B to insure provision in the lower part of said zone of a fluidized or bubbling reaction bed, as distinguished from a violent or turbulent gaseous suspension. Throughout their reduction and treatment in the reaction zone, the solids will not be permitted to settle out to form a solid reacting mass. Maintenance of the desired fluidized condition can be effectively had by resorting to a velocity of gaseous material passing through line 4 of not less than, say, about 40 feet per second and of an order such that, upon introduction into and expansion within the enlarged zone B, an upward flow of gas prevails of an order of about .1–10 feet per second, and preferably from .2–2 feet/sec., employing solids of the particle size indicated above. The reactor B is maintained at temperatures ranging from in excess of about 600° C. to about 1050° C., but preferably temperatures of from about 850–1000° C. prevail. These temperatures can be maintained by means of the heat generated from the reduction and conversion of the ilmenite during its reaction with the halogen gas, but, if desired, resort to external or other heating (as by burning coke or other fuel) can be had prior to commencement of the halide-producing operation, in order to bring up the reaction zone to the desired temperature prior to reaction or maintain it at such temperature throughout the reaction. The products of reaction ($TiCl_4$ and $FeCl_3$-containing gases) generated in reactor B are discharged from the upper extremity thereof into the conduit 2 which is in open communication with the outlet of the reactor B and pass, via said conduit 2, into cyclone C and out of the system via valve-controlled conduit 15 to suitable condensing equipment (not shown) for separation and recovery.

The apparatus shown in the drawing provides for pre-heating of the solid feed materials being fed to the system through contact with the chlorination products exiting from the reactor B whereby added flexibility of the process is afforded. The hot furnace gases contain titanium chloride, ferric chloride, oxides of carbon and some residual chlorine, the composition of which will depend on operating conditions. The gases are at the furnace temperature and must be cooled to room temperature or below, in order to recover the titanium tetrachloride therefrom. I find that this cooling can be accomplished by subjecting the gases to direct contact with the solid feed material in a contact zone such as shown by conduit 2 in the drawing. It is obvious that the greater contact time provided in conduit 2, the greater will be the heat transfer efficiency within certain limits and such heat transfer serves both to conserve heat in the chlorination system and to aid in reaching the condensation temperature of the chloride-containing gases. During such contact, residual or unreacted chlorine in the gases will be consumed through reaction with the feed material and increased chlorine efficiencies will result. It is thus seen that this mode of operation provides greater recovery of chlorine, desirable conservation of heat for the chlorination reaction, and a substantial cooling of the chloride gases, thereby allowing simpler condensation equipment. The increased recovery of chlorine may be up to about 2% and the conservation of heat becomes important when dilute chlorine is recovered from pigment production as by oxidation of $TiCl_4$ by air. Such chlorine contains large amounts of nitrogen and may run only 25–30% $Cl_2$ with some excess oxygen but the balance being largely nitrogen. The heating of this inert nitrogen and the cold solid reactants may consume more heat than is supplied by the reaction taking place in the reactor. This method of preheating the reactants is then attractive and the proposed operation has the added advantage of removing undesirable heat from the chloride reaction gases.

Since ilmenite or other titanium ores contain minor amounts of impurities not volatilizable as chlorides, and furthermore since certain ash residues result from the use of coal and coke, provision must be made, where a continuous type of operation is contemplated, for removal of non-volatilizable and residual materials from the chlorination chamber. Preferably, however, the non-volatilizable impurities or ash residues are allowed to accumulate in chamber B. Since new feed material is added continuously, the iron and titanium content of the solids in vessel B never reaches zero. In the case of Indian ilmenite, the proportions of non-volatilizable or ash material to $TiO_2$ are such that when the $TiO_2$ content of the material in the chamber B drops to, say, 10–15%, due to dilution with ash residues, the yield of titanium evolved as titanium tetrachloride will be in excess of 95% of the titanium fed to the system. Preferably, also, the process is operated with a fluidized bed in chamber B which is high in ash residue but low in $TiO_2$, say, 10–20%. As the low $TiO_2$ material accumulates in the chamber, it may be removed and discarded as ash without incurring any adverse effect upon yield.

When removal of solid, residual reaction products from retort B is desired to afford a continuous type of operation, this can be readily effected. Thus, as shown in the drawing, suitable means can be associated with the chamber B, comprising an outlet means 5, provided with a control valve 20, in the lower portion of the chamber B, which outlet communicates with a line 6 in which a cooler D is interposed and a line 16' containing a control valve 27. The conduit 6 communicates, at a point immediately below a valve 22 in a line 9 leading to the line 2, with a line 7 containing control valve 21. The line 7 leads to and discharges into a cyclone separator E provided with outlets 8 and 10, through which outlets solids and gases respectively are discharged from the system after separation in the cyclone. In operation the valves 20 and 21 are opened, while valve 22 is in closed position. An inert gas such as the uncondensable gas from the $TiCl_4$ recovery system is caused to be introduced into the system through the conduit 16' and valve 27, the purpose of which introduction is to carry the ash residues withdrawn through the line 5 from the chamber B through the system in a fluidized condition. After the reaction vessel B reaches equilibrium, ash removal may be continuous, although preferably an intermittent ash removal operation is resorted to, due to the relatively small quantities involved.

In a large system the heat of reaction generated in the reactor B may be of such magnitude that radiation losses alone will not keep the temperature within the desired limits. This is particularly true when using pure chlorine or the chlorine which is recovered from the oxidation of $TiCl_4$ by oxygen (rather than air). Under such conditions, control of the temperature in said reactor may be effected by circulating a portion of the fluidized bed from said reactor through an external cooler, and then returning the cooled products to the system. As shown in the drawing, this recirculation can be conveniently accomplished by recirculating through the cooler D and in a manner identical to that proposed for effecting ash removal, except that in such instance the valve 21 in the line 7 is maintained in closed position while the valve 22 in line 9 is opened. It is also possible to remove heat by using a cooler such as designated F in the drawing or by cooling the product on its way from cyclone C to the intake line 4. As a result, heat is removed from the system by heat exchange methods and one is able to avoid too high a temperature in reactor B.

Under certain conditions it may be desirable to provide a colder feed material or to further cool the gaseous products generated in reactor B than can be obtained by simple mixing of the feed from hopper A and the gaseous products from reactor B in conduit 2. This can be readily accomplished by recirculating a portion of the feed from stand-pipe 3 through a second cooler F by allowing solid feed material in the stand-pipe to fall into a conduit 12, controlled by valve 26, leading to a line 13, containing the cooler F and which line 13 feeds into the conduit 2. By means of a conduit 16", controlled by valve 28, an inert gas, such as the non-condensable gases from a $TiCl_4$ recovery system, may be conveniently fed into the line 13 for purposes of picking up solids being fed into line 13 from line 12 and carrying them in suspension through said conduit 13 and cooler F for discharge into conduit 2.

In commencing an operation, the reaction vessel B may be readily heated to operating temperature by burning fuel therein or introducing hot products of combustion from an oil burner or other source through a conduit 16, controlled by valve 24, which leads to conduit 4 into reaction chamber B and exhausting through valve 19 and conduit 11. All valves except numbers 19 and 24 remain closed during preheating.

It will thus be seen that in accordance with this invention chlorination is effected by admitting a finely divided mixture of ilmenite and a solid reducing agent into the lower portion of an upright, relatively narrow, elongated reaction chamber in which the titanium and iron present are caused to be reacted with elementary chlorine while the reactants are maintained in substantially constant motion throughout reaction by means of the gaseous reagent. As indicated, it is essential to the invention that the upward flow of the chlorine-containing gas through the reaction chamber shall be sufficiently rapid to maintain the suspension of solids undergoing treatment in a more or less fluid condition and that the height of the suspension must be great enough to provide sufficient contact of the solid reactants with the gas to convert the chlorine or other halogen to the desired halide. Obviously, the dimensions of the chlorination chamber will be determined in part by the state of subdivision of the titaniferous feed material, its titanium and iron content, and the prevailing temperature and purity of the chlorine being consumed. Since the reaction requires only .10–.20 pound of solids for reaction with each cubic foot of chlorine gas, it is apparent that if the whole of the chlorine is used to convey the solid reactants into the reaction zone, a very dilute suspension will result. In order to form the fluidized bed at the start of the operation, the initial solids feed rate is higher than the equilibrium rate. When a bed of the desired height is obtained, the solids feed rate is reduced to that required for equilibrium. It has been found that 20 or more pounds of titanium tetrachloride per cubic foot of reaction chamber space per hour may be produced, and that large amounts of anhydrous titanium tetrachloride can be obtained in relatively small equipment. Thus, a chamber of between 50 and 60 cu. ft. capacity is capable of producing over 10 tons of $TiCl_4$ per day.

To a clearer understanding of the invention, the following illustrative examples are given, none of which is to be considered as in any wise limiting the invention:

*Example I*

A finely divided, powdered mixture (capable of passing a 200-mesh screen) of 1 part of hard, burned coke and 5 parts of rutile ore is fed from a storage vessel into a chlorine gas stream flowing at a rate of 40 ft./second to the bottom of an elongated, enlarged, vertical reaction chamber previously heated to a temperature of 900° C. The proportion of solids to chlorine in the resulting solids-gaseous mixture was approximately that of theoretical, or about 100 pounds of solids per 750 cubic feet of chlorine. The velocity of the chlorine stream was sufficient to maintain the solids resultingly entrained in the chlorine in a fluidized state or bed after introduction of the mixture into the reaction zone and, furthermore, such velocity was sufficient to maintain in said zone an upward flow of gas therethrough of 0.5 ft./second. After reaction the iron and titanium chloride reaction products were removed from the enlarged reaction chamber and collected from the chamber exit gases upon cooling to approximately room temperature. Since the chlorination reaction provided an increase in volume of the gas during its passage through the reaction chamber, due to the increase in temperature and formation of new volatile products; namely, carbon monoxide and carbon dioxide, as well as the volatile chlorides, this proved quite helpful in promoting and maintaining the turbulent conditions which it was desired to effect in the reaction chamber during the chlorinating reaction. Upon completion of the reaction, it was found that substantially 100% conversion of the $TiO_2$ to $TiCl_4$ was effected without encountering any plugging of the apparatus, the chlorinating operation continuing for several hours without any interruption or difficulty.

*Example II*

Dry Indian ilmenite which had been ground to pass a 200 mesh screen was mixed with hard burned coke which had been ground to approximately the same fineness in the ratio of 100 parts of ilmenite to 35 parts of coke. The ilmenite analyzed 60.0% $TiO_2$, 24.5% $Fe_2O_3$, 9.6% FeO, together with 5.9% so-called gangue material. The reaction vessel in this case consisted of a silica tube 8 feet long and 1.56 inches in diameter with a constricted bottom through which chlorine could be introduced and a side arm near the top through which the products of the reaction were removed. The ore-coke mix was introduced through the top of the reactor by means of a screw feeder and a delivery tube entering through the top of the reactor and extending downward about 4 feet. The feed mixture flowed through the delivery tube by gravity. A slow stream of nitrogen amounting to about 10% of the chlorine was used added at the top of the delivery tube to prevent plugging of the delivery tube by the products of the reaction. The silica reaction vessel was heated externally to bring it up to operating temperature and to overcome radiation losses. Chlorine was introduced into the bottom of the reaction vessel at the rate of 200 liters per hour measured at room temperature and atmospheric pressure. This chlorine rate will give a linear velocity of about .6 feet per second in the reactor at an operating temperature of 950–1000° C. After the chlorine flow had started, the ilmenite coke feed was added at the rate of 243 grams every five minutes until a total of 1175 grams had been added. The chlorine flow was continued for two hours, at which time 91.4% of the iron and 90.5% of the $TiO_2$ originally present in the feed had been collected as chloride. When the reaction vessel was opened at the bottom just after the chlorine was shut off, 94% of the total residual solid fell quite easily from the reaction vessel showing that the solids had been maintained in a fluid condition without plugging or sticking throughout the reaction.

*Example III*

In this example, the apparatus illustrated in the drawing was used. Reaction vessel B was preheated to a temperature of 800–850° C. by introducing the products of combustion from an oil burner through conduits 16 and 4 into the bottom of the reaction vessel and exhausting through pipe 11. A charge consisting of 100 parts of Indian ilmenite passing a 60-mesh screen (but retained on a 150-mesh screen) together with 15 parts of hard burned coal which passed a 20-mesh screen but was retained on a 150-mesh screen was prepared. When reaction vessel B had reached 850° C., valve 19 was partially closed so that a gas velocity of 50 ft./sec. was obtained in conduit 2. The ore-coke mix was placed in hopper A and was then fed, via valve 17, to conduit 2. The rate of feed was 837#/hour until a total of 1000# had been added. After being partially preheated, the feed was separated from the gas in cyclone C, fell into pipe 3 from whence it was fed through valve 18 into line 4. The initial feed formed a fluid or bubbling bed about 3 feet high in reactor B. Introduction of combustion products through line 16 continued until the whole charge reached the temperature 800° C. The rate of addition of combustion gases was controlled to give a linear gas velocity of 1.2 ft./sec. in the reactor. Upon reaching a reaction temperature of 800° C., the flow of combustion products was stopped by closing valve 24, and simultaneously therewith chlorine was admitted through line 4 into the bottom of the reactor by opening valve 25. The chlorine rate of introduction was adjusted to 1144#/hr. At this rate, a linear gas velocity of 1.2 ft./sec. prevailed in the reactor. At this point valve 19 was entirely closed and valve 23 opened, causing the products of the reaction to leave the reactor and system for condensing and recovery by means of outlet 2, cyclone C and line 15. As soon as the chlorine flow started, valve 17 was opened, admitting the ore-coke feed mixture into line 2 at a rate of 772#/hour. Introduction of the feed at this point cooled the gases leaving the furnace to approximately 400° C. with consequent preheating of the feed to the same temperature. In cyclone C the solids were separated from the gas stream and fed to reactor B, as already described. To prevent overheating in reactor B due to the heat of reaction, a portion of the bubbling bed was withdrawn from the reactor through discharge outlet 5, these solids being picked up by a stream of cold combustion products from the oil burner entering line 6 from the feed line, and being carried through cooler D to the top of the reactor, valve 21 in line 7 being closed and valve 22 being open. Very fine ash resulting from the chlorination was discharged from the system with the products through the outlet 15. Coarse ash was allowed to accumulate in the reactor until the composite material in the reactor analyzed between 15 and 20% $TiO_2$, this stage of the operation being reached about 15 hours after commencement of the chlorination. At this point periodic ash removal was started. Instead of circulating through cooler D back to the top of the reactor, valve 21 was opened and valve 22 was closed. The suspended ash was removed from the gas in cyclone E, the ash being discharged through line 8 and the gas exhausted through line 10. The amount of the ash being small (less than 10% of the feed), it was removed intermittently at the rate of about 65#/hour. At the start of ash removal, the feed rate was increased to 837#/hour in order to maintain the total weight of solids in the bed at about 1000 lbs. Operating over long periods of time, over 95% of the $TiO_2$ and iron content of the original feed was converted to the corresponding chloride. The free chlorine in the exit gases amounted to less than 10% of the chlorine fed to the bottom of the reactor. When the operation was shut down, the reactor was emptied by withdrawing the bed through cooler D and cyclone E in the same way that ash was removed. The solids in reactor B and in the circulating system remained fluid throughout the operation.

While in its preferred embodiment the invention comprises the addition of three reactants to a reaction chamber in the preparation of titanium tetrachloride: (1) ilmenite, the material to be chlorinated, (2) a solid type reducing agent (carbon, coal, coke, etc.), and (3) a gaseous reactant, such as pure chlorine, it obviously is not limited thereto nor to the reactants, proportions, or temperatures mentioned. Thus, in addition to ilmenite, other types of titaniferous materials or oxides, including rutile ore or various artificial titanium oxide concentrates can be used, provided they are in finely divided state and are capable of being transported by gases through the conduits of the apparatus and of being maintained as a fluidized bed within the reactor. Such particles will range in size from powdered form up to particles capable of passing a 50-mesh screen. In ilmenite use, the gaseous products of reaction will be ferric chloride and titanium chloride. As is well known, these are capable of ready separation because of the wide difference in their condensation temperatures. The preferred reducing agents, as already stated, comprise those of the solid type, especially free carbon or coke. If desired, gaseous reducing agents, such as carbon monoxide and those which are non-reactive towards the chlorinating or halogenating gas, also can be employed and with equally good effects. Phosgene acts as both a reducing agent and a chlorinating agent and hence, when used, only two reactants will be required in the process. Obviously, other carbonyl halides are employable and will act in the same manner as phosgene. While a 1:5 ratio of reducing agent to ore is preferred for use, such ratio can be varied, if desired, to ratios ranging from 1:2 to 1:6 or greater. The carbonaceous reducing agent is oxidized during my process to either carbon monoxide or carbon dioxide. The supply of oxygen is determined by the amount of ore present and the presence of an excess of carbon, along with high temperature, acts to convert the carbon to the lower oxide with generation of less heat. Lesser amounts of carbon aid in obtaining conversion to carbon dioxide and afford a greater heat of reaction. This is desirable where the heat losses of the system tend to approach or become greater than the heat of reaction. It is obvious, therefore, that at least 12 parts by weight of carbon must be supplied for each 142 parts of chlorine consumed in the production of titanium tetrachloride from titanium dioxide or ferric chloride from ferric oxide in accordance with my invention. The carbon consumption may double this figure if it is available in the reaction chamber and the amount to be used should be so selected that the heat balance in the system is maintained with the least difficulty. Likewise, although relatively pure chlorine is preferred for use as the gaseous medium utilized in the process, diluted forms of chlorine, such as mixtures of chlorine and nitrogen or chlorine and carbon monoxide, as well as carbon tetrachloride, phosgene, sulfuryl chloride, sulfur monochloride, etc., may be used.

In obtaining the chlorides of titanium and iron in accordance with the invention, the oxide or other compound containing the metal the halide of which is being produced can be chlorinated through use of free chlorine or by compounds which yield reactive chlorine at the reaction temperatures used in the process. Compounds of the latter type include carbon tetrachloride, phosgene, sulfuryl chloride, sulfur monochloride, etc.

Air or oxygen can be admitted to the reaction zone to heat it to the desired reaction temperature and also to maintain it at that temperature during the halogenation operation. In most instances this is not necessary or advisable unless it is desired to heat the apparatus to the desired reaction temperature or where the heat supplied by the reaction is less than the heat loss from the reaction chamber. In the latter instance, one may add a larger quantity of reducing agent and generate heat by adding an oxygen-containing gas in addition to the halogen.

While it is preferred to charge a mixture of the reducing agent, ore and halogenating gas into the reaction chamber, it will be obvious that the benefits of the invention may be obtained through an operation in which the materials are separately added to said zone for reaction. If desired, sand type ilmenite can be directly employed in the process, although I preferably use ilmenite or an ilmenite-carbonaceous mixture which has been ground finer than 100 mesh due to the ease with which such material permits maintenance of the reaction bed in a fluid condition.

This application is a continuation-in-part of my application (now abandoned) Serial No. 588,973, filed April 18, 1945.

I claim as my invention:

1. A process for producing titanium tetrachloride comprising reacting within an enlarged reaction chamber maintained at a temperature ranging from 850–1000° C. a finely divided mixture of a titaniferous ore and a solid carbonaceous reducing agent and gaseous chlorine, maintaining the solid reacting components of said mixture in fluidized state in the form of a constant, bubbling bed suspension in the lower part of said chamber through the upward movement of gaseous chlorine into said chamber, withdrawing gaseous products of reaction from said chamber to a contact zone for concurrent flow with and preheating of fresh finely divided solid reactants being charged to said chamber and for utilizing the chlorine content of said reaction products, separating the cooled gaseous reaction products from the solid reactants thereby heated, recovering the titanium tetrachloride product by condensation while simultaneously adding the preheated solid reactants and chlorine to the reaction chamber, and throughout the reaction maintaining a uniform temperature within the reaction chamber to prevent sintering and formation of ferrous chloride therein by withdrawing during the reaction a portion of said bubbling bed suspension, subjecting said portion to cooling treatment and thereafter returning the cooled products to said chamber.

2. A method for chlorinating a titaniferous material, comprising charging said material in finely divided state and as a chlorine-containing gaseous suspension with a finely divided solid carbonaceous reducing agent upwardly for reaction into an enlarged reaction zone maintained at a temperature ranging from about 600–1050° C., during the reaction maintaining the solid components in said suspension in fluidized state and as a constant, bubbling bed suspension within the lower portion of said reaction zone, withdrawing a portion of the bed suspension from said zone and subjecting it to cooling treatment, returning the cooled products obtained from said treatment to said enlarged reaction zone, removing from the latter gaseous products of reaction formed therein and passing them into a contact zone for direct commingling and heat exchange relationship with fresh, finely divided titaniferous and carbonaceous reducing agent solid reactants being charged as a chlorine-containing gaseous suspension to the system, separating the cooled gaseous reaction products from the resulting preheated fresh solid reactants, recovering the chlorination products from said cooled products.

and charging said preheated solid reactants into said enlarged zone for reaction.

3. A process for chlorinating a titaniferous material to obtain titanium tetrachloride therefrom which comprises charging said material in finely divided state entrained in a chlorine-containing gas with a finely divided, solid carbonaceous reducing agent in a mixture having a ratio ranging from 1:2 to 1:6 of carbonaceous reducing agent to titaniferous material into the lower portion of a closed, enlarged reaction zone maintained at a temperature ranging from about 600° C.–1050° C. for upward flow through said zone, charging said chlorine-containing gas into said zone at such velocity that upon its introduction therein an upward flow of gas therethrough of about .1–10 feet per second will prevail and throughout the reaction of said mixture within said zone the solid components of said suspension are maintained in fluidized state therein and in the form of a constant, bubbling bed suspension in the lower part of said zone, during the chlorination reaction maintaining a uniform temperature ranging from about 600–1050° C. in said reaction zone and preventing sintering and formation of ferrous chloride therein by withdrawing therefrom a portion of said bed suspension, subjecting the portion thus withdrawn to cooling treatment and returning the resulting cooled products to said bed and zone, and thereafter recovering the titanium tetrachloride reaction product from the resulting products of reaction.

4. A process for producing titanium tetrachloride which comprises introducing for upward passage into an enlarged, closed reaction zone maintained at a temperature of about 850° C.–1000° C. a chlorine gas-suspended mixture containing a ratio of 1:5 of finely divided coke and finely divided ilmenite, charging said chlorine-containing gas at such velocity that upon its introduction into said zone an upward gas flow therethrough of about .1–10 feet per second will prevail, and throughout the resulting chlorination reaction the solid reacting components of said mixture are maintained in a fluidized state in the form of a constant, bubbling bed suspension in the lower part of said reaction zone, during the chlorination reaction maintaining a uniform temperature ranging from about 600°–1050° C. in said reaction zone and preventing sintering and formation of ferrous chloride therein by withdrawing therefrom a portion of said bed suspension, subjecting the portion thus withdrawn to cooling treatment and returning the resulting cooled products to said bed and zone, and thereafter recovering the resulting titanium tetrachloride.

5. A process for producing titanium tetrachloride which comprises continuously feeding upwardly into the lower portion of an enlarged reaction zone maintained at a temperature ranging from about 850° C.–1000° C., a chlorine-containing gas containing an entrained mixture, in the ratio of 1:5, of finely divided coke and finely divided rutile, charging said gas into said zone at such velocity that upon its introduction therein an upward gas flow therethrough of about .1–10 feet per second will prevail and said coke and rutile solids material will remain entrained therein in the lower portion of said zone and form a fluidized, bubbling reaction bed, during the chlorination reaction maintaining a uniform temperature ranging from about 600–1050° C. in said reaction zone and preventing sintering and formation of ferrous chloride therein by withdrawing therefrom a portion of said bed suspension, subjecting the portion thus withdrawn to cooling treatment and returning the resulting cooled products to said bed and zone, and removing and recovering the resulting titanium tetrachloride reaction product from said zone.

6. A process for producing titanium tetrachloride which comprises introducing for upward flow into the bottom of an enlarged reaction chamber maintained at an elevated temperature ranging from about 600° C. to 1050° C., a chlorine-containing gas-suspended mixture containing a ratio of 1:5 of a titanium ore passing a 60-mesh screen but retained on a 150-mesh screen and coke passing a 20-mesh screen but retained on a 150-mesh screen, charging said chlorine-containing gas at such velocity that upon its introduction into said zone an upward gas flow therethrough of about .2–2 feet per second will prevail and employing a gas feed rate for such flow such that throughout the reaction the solid components of the mixture are maintained in the lower part of said chamber in fluidized state in the form of a constant bubbling bed suspension, during the chlorination reaction maintaining a uniform temperature ranging from about 600–1050° C. in said reaction zone and preventing sintering and formation of ferrous chloride therein by withdrawing therefrom a portion of said bed suspension, subjecting the portion thus withdrawn to cooling treatment and returning the resulting cooled products to said bed and zone, and thereafter recovering the titanium tetrachloride generated in the process.

References Cited in the file of this patent

UNITED STATES PATENTS

| Number | Name | Date |
|---|---|---|
| 1,984,380 | Odell | Dec. 18, 1934 |
| 2,020,431 | Osborne et al. | Nov. 12, 1935 |
| 2,184,887 | Muskat et al. | Dec. 26, 1939 |
| 2,311,564 | Munday | Feb. 16, 1943 |
| 2,373,008 | Becker | Apr. 3, 1945 |
| 2,446,221 | Ferguson | Aug. 3, 1948 |

OTHER REFERENCES

Kalbach, June 1944, "Chemical and Metallurgical Engineering," pages 94–98.

"The Fundamental Basis of Fluidization," Coke and Gas, February 1949, pages 64–68.